March 11, 1924.
R. W. SCHROEDER
1,486,269
AUTOMATIC PRIMER FOR FLOW METERS
Original Filed July 2, 1921
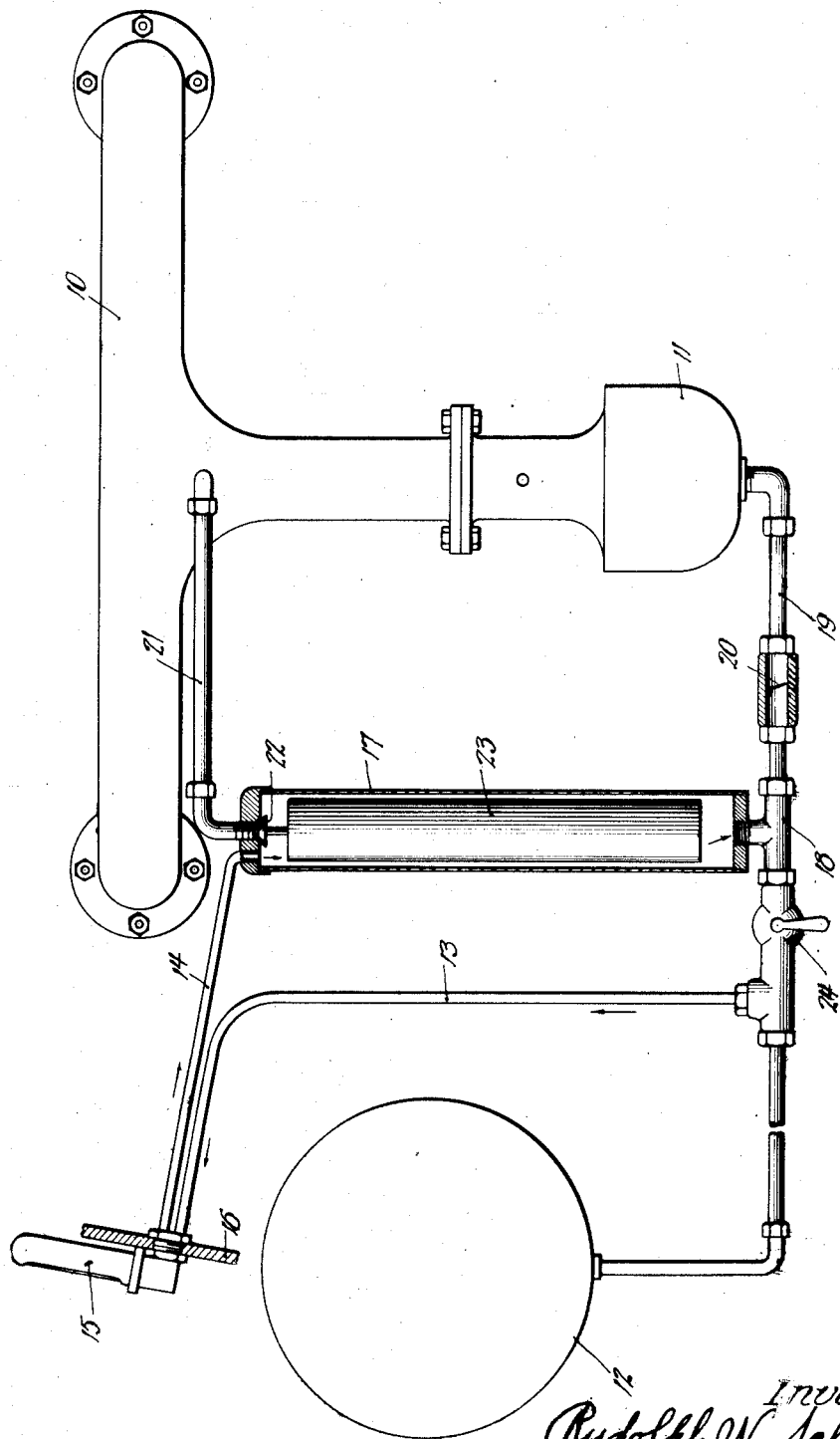
Inventor
Rudolph W. Schroeder
By Nissen & Crane Attys.

Patented Mar. 11, 1924.

1,486,269

UNITED STATES PATENT OFFICE.

RUDOLPH W. SCHROEDER, OF CHICAGO, ILLINOIS.

AUTOMATIC PRIMER FOR FLOW METERS.

Application filed July 2, 1921, Serial No. 482,276. Renewed September 13, 1922. Serial No. 588,084.

*To all whom it may concern:*

Be it known that I, RUDOLPH W. SCHROEDER, a citizen of the United States, residing at Chicago, in the county of Cook and State of Illinois, have invented certain new and useful Improvements in Automatic Primers for Flow Meters, of which the following is a specification.

This invention relates to flow meter installations for automobiles and other devices in which fuel burning engines furnish motive power, and has for its object the provision of an installation including mechanism for automatically priming the siphon in which the flow meter is located and which shall be of improved construction and operation.

The invention is exemplified in the combination and arrangement of parts shown in the accompanying drawing and described in the following specification, and it is more particularly pointed out in the appended claims.

In the drawing, the figure represents somewhat diagrammatically a vertical section of a portion of an automobile showing the flow meter installation.

The numeral 10 designates the intake manifold of an internal combustion engine having a carbureter 11 through which fuel is supplied to the engine. The fuel flows to the carbureter 11 by gravity from a tank 12 passing upwardly by a siphoning operation through pipes 13 and 14 which lead respectively to and away from a flow meter 15. The flow meter 15 is shown as mounted on the dashboard 16 of an automobile.

The pipe 14 discharges into a float chamber 17 from which an outlet 18 leads to the carbureter 11 by means of a pipe 19. A one-way valve 20 is inserted in the pipe 19 to prevent any tendency to a return flow from the carbureter. The upper end of the float chamber 17 is connected by a pipe 21 with the intake manifold 10 and the opening to the pipe 21 is provided with a valve 22 carried on a float 23 in the chamber 17. A bypass valve 24 is provided between the connection 13 with the flow meter and the connection 18 with the lower end of the chamber 17. In case for any reason the connection with the flow meter fails to operate fuel may be admitted to the carbureter 11 directly through the bypass valve 24 by opening this valve. In the normal operation of the machine, however, the fuel will pass from the tank 12 upwardly through the tube 13 to the flow meter 15, and from the flow meter will discharge into the chamber 17 through the pipe 14. The flow of fluid from the tank 12 to the carbureter passes through the flow meter by a siphoning operation. The chamber 17 will be normally filled with fuel holding the valve 22 closed so that the suction from the intake manifold will not affect the fuel in the float chamber.

If for any reason the flow meter siphon is opened to atmosphere, as by a broken glass or a loose connection, the level of the liquid in the pipe 13 and the chamber 17 will be lowered to the level of the liquid in the tank 12. This will break the siphoning operation and thus shut off the supply of fuel to the engine. It is not necessary to wait until the flow meter circuit is repaired before the engine can be operated, however, as fuel may be admitted directly to the carbureter by opening the bypass valve 24. When the bypass valve is opened the fuel will have the same level in the chamber 17 as in the supply tank and will continue to hold the valve 22 closed so that no air is admitted to the intake manifold through pipe 21 and the operation of the engine will be unaffected by injury to the flow meter circuit. When the flow meter is first installed, or when it has been repaired after a break in the siphon circuit, the bypass valve is again closed, but it will be necessary to remove the air from the flow meter circuit to start the siphoning operation. After the bypass valve is closed the engine will first start on the fuel in the float chamber 17 and thus gradually lower the surface level below that of the supply tank. It will be seen that as the liquid in the float chamber is lowered the float 23 will be correspondingly lowered, thus opening the valve 22. This will subject the upper end of the chamber 17, the pipe 14, and the flow meter 15 to the suction of the intake manifold, and in this way air or gas from the flow meter circuit will be removed, automatically priming the siphon and restoring the operation of the flow meter. During the priming operation the valve 20 will prevent the suction of the intake manifold from tending to draw fuel backwardly from the carbureter. After the flow meter circuit has thus been primed the engine will continue to operate on fuel drawn through the flow meter circuit. It will be seen that all the operator need do in case of accident to the flow meter is to open the bypass valve 24 and after the difficulty has been repaired again, close the valve. The priming of the flow meter is automatically accomplished when the engine is started.

I claim:

1. The combination with a liquid burning engine having a source of fuel supply from which fuel runs by gravity to said engine, of a flow meter in the fuel circuit situated at a point above the fuel level of said source of supply, and a connection with said engine for exhausting gaseous material from said flow meter.

2. The combination with a liquid burning engine having a source of supply from which fuel flows by gravity to said engine, of a flow meter connected by a siphon in the fuel circuit of said engine, and means for subjecting said siphon to engine vacuum for priming said siphon.

3. The combination with a liquid burning engine having a gravity fuel feeding system, of a flow meter connected by a siphon in the fuel circuit of said engine, and means for automatically subjecting said siphon to engine vacuum to automatically prime said siphon whenever the action of said siphon is broken by the presence of gaseous material therein while said siphon constitutes the means of communication between said engine and its source of fuel supply.

4. The combination with a liquid burning engine, of a gravity feed for supplying fuel to said engine, a flow meter connected by a siphon in the fuel circuit of said engine, means for connecting said siphon with said engine to subject said siphon to engine vacuum, a valve for closing said connecting means, and a float for normally closing said valve, said float being arranged to open said valve when the liquid level in said siphon is sufficiently lowered.

5. The combination with a fuel burning engine, of means for supplying fuel to said engine comprising a tank and connecting conduits, a flow meter connected with said conduits at a point above the surface level of the liquid in said tank, a bypass for conducting fuel from said tank to said engine without passing through said flow meter, a valve for controlling said bypass, and means for automatically subjecting said flow meter to engine vacuum when the liquid is lowered in the conduits connected with said flow meter and said valve is closed.

6. The combination with a fuel burning engine having an intake manifold and a carbureter to supply fuel thereto, of a tank for supplying fuel by gravity to said carbureter, a flow meter located above the surface level of the fuel in said tank and connected in the fuel circuit of said engine so that liquid passing from said tank to said carbureter passes by a siphoning operation through said flow meter, a float arranged in the connection to said flow meter, a conduit connecting said flow meter with said intake manifold, and a valve controlled by said float for closing the conduit to said manifold when the liquid level is sufficiently lowered in the connection with said flow meter.

7. The combination with a fluid burning engine having an intake manifold and a carbureter, of a tank for supplying fuel to said carbureter, a conduit through which fuel flows from said tank to said carbureter, a flow meter located above the fuel level in said tank and connected with the conduit from said tank to said carbureter so that fuel passes through said flow meter, a bypass for permitting fuel to flow directly from said tank to said carbureter without passing through said flow meter, a hand controlled valve for opening and closing said bypass, a float chamber in said flow meter circuit, a connection between said float chamber and said intake manifold, a valve for closing said connection, a float for holding said valve in closed position while said float chamber is filled with liquid and for opening said valve to submit said flow meter to manifold vacuum when the liquid is sufficiently lowered in said float chamber, and a check valve for preventing return flow from said carbureter under the influence of manifold vacuum on said float chamber.

8. The combination with a liquid burning engine, of a source of fuel supply to said engine, two passages for conducting fuel from said source to said engine, a flow meter in one of said passages, a valve in the other of said passages, and means controlled by the height of fluid in said flow meter passage for connecting said passage with engine vacuum when the valve in the other of said passages is closed.

9. The combination with a liquid burning engine, of a source of supply for said engine from which fuel is fed by gravity, a conduit forming a siphon from said source of supply to said engine, a flow meter located in said siphon, a second conduit from said source of supply to said engine, a valve for closing said second conduit, and means for automatically subjecting said siphon to engine vacuum when the operation of said siphon is broken and when said valve is closed.

10. The combination with a liquid burning engine, of a tank for supplying fuel by gravity to said engine, a pair of conduits for conducting fuel to said engine, one of said conduits comprising a siphon having a flow meter therein, a valve in the other of said conduits, means for connecting said siphon with said engine to subject said siphon to engine vacuum, a valve closing said connecting means, and a float for normally holding said valve closed but arranged to open said valve when the liquid level in said siphon reaches a point below the bottom of said tank.

11. The combination with a liquid burning engine, of a tank for supplying fuel by gravity to said engine, a conduit comprising a siphon for connecting said tank to said engine, a flow meter in said siphon, a conduit comprising a bypass for said siphon leading from said tank to said engine, a valve in said bypass, a float arranged in said siphon, means for connecting said siphon with said engine to subject said siphon to engine vacuum, and a valve controlled by said float for closing said connecting means, said float being arranged to close said last-named valve when the liquid in said siphon is as high as a level approximately that of said supply tank but to open said valve and subject said siphon to engine vacuum when the liquid in said siphon reaches a level approximately that of said supply tank.

In testimony whereof I have signed my name to this specification on this 22d day of June, A. D. 1921.

RUDOLPH W. SCHROEDER.